United States Patent [19]
Flynn

[11] Patent Number: 5,816,195
[45] Date of Patent: Oct. 6, 1998

[54] DEBRIS CONTAINMENT SYSTEM FOR USE BY ANIMALS AND RELATED METHOD

[76] Inventor: John Flynn, 18 Stony Brook Rd., Hopewell, N.J. 08542

[21] Appl. No.: 794,676

[22] Filed: Feb. 3, 1997

[51] Int. Cl.$^6$ ........................................................ A01K 1/35
[52] U.S. Cl. ............................................................ 119/165
[58] Field of Search .................................... 119/165, 166, 119/168, 170

[56] References Cited

U.S. PATENT DOCUMENTS

| | | | |
|---|---|---|---|
| 5,042,430 | 8/1991 | Casmira | 119/165 |
| 5,218,930 | 6/1993 | Casmira | 119/165 |
| 5,615,639 | 4/1997 | Knight | 119/168 |
| 5,690,051 | 11/1997 | Fisher et al. | 119/166 |

FOREIGN PATENT DOCUMENTS 2509125  9/1976  Germany ................................ 119/165

*Primary Examiner*—Robert P. Swiatek
*Attorney, Agent, or Firm*—Harness, Dickey & Pierce, P.L.C.

[57] ABSTRACT

A debris containment system for use with a litter box for containing litter tracked from the litter box by an animal's paws includes a collection pan for collecting the litter. The collection pan is formed to include a funnel portion to facilitate quick and easy disposal of the litter. Preferably, the litter containment system also includes a grid member which cooperates with the collection pan to extract debris which is otherwise trapped between the paws of the animal. Further in the preferred embodiment, the collection pan is constructed of a flexible rubber and can be folded about a centerline when litter is being emptied therefrom.

12 Claims, 1 Drawing Sheet

DEBRIS CONTAINMENT SYSTEM FOR USE BY ANIMALS AND RELATED METHOD

BACKGROUND OF THE INVENTION

1. Technical Field

The present invention relates generally to debris containment systems for use by animals. More specifically, the present invention relates to a debris containment system for animals particularly adapted to cooperate with a litter box structure and adapted to remove debris from an animal's paws when the animal exists the litter box structure and collect the debris for easy disposal or reuse.

2. Discussion

House cats and other various species of indoor animals can quickly and easily be trained to use indoor sanitary facilities, thereby eliminating the necessity of taking the animal outside. Known structures for collecting animal excrement typically utilize some form of absorbent material, such as litter or sand and are commonly referred to as litter boxes. The absorbent material appeals to a cat's instinct to conceal its excretions. In this regard, a cat will always attempt to cover its excrement if provided with the opportunity. The cat does this by scratching and clawing at the surrounding material. In a litter box filled with litter, the cat will instinctively claw and scratch at the litter in the facility to cover the excrement. A number of different types of litter box structures have heretofore been employed.

While known litter box structures have proven to be commercially acceptable for a wide range of applications, all are associated with drawbacks and limitations. In particular, one significant problem associated with known litter box structures relates to the tracking of litter throughout the house. When a cat is in a litter box, an appreciable amount of litter or sand becomes trapped between the pads of its feet. When the cat exits the litter box, the absorbent material works its way free and is gradually deposited over the surrounding floor area and throughout the house. In recognition of this problem, a number of devices have been developed which are intended to dislodge the litter material from the cat's paws and retain the removed litter for convenient disposal. However, all such known devices heretofore employed, including but not limited to those discussed below, have presented problems in the art.

U.S. Pat. No. 3,246,630 discloses an arrangement including a screen area over which a cat must walk which functions to dislodge trapped debris from the cat's paws. Disadvantageously, the screen area significantly reduces the litter holding area of the facility. Moreover, the facility itself incorporates the screen inside the cover. Therefore, the screen is awkward to retrieve for cleaning and cannot be retrofitted to existing facilities. An owner of an existing facility must replace the entire facility to benefit from the screen, thereby increasing associated expense.

U.S. Pat. No. 3,885,523 also discloses an arrangement including a screen over which the animal is encouraged to walk in order to displace litter trapped within the animal's paws. Similar to the arrangement disclosed in U.S. Pat. No. 3,246,630, the screen is carried inside the existing facility which present the very problem associated with the '630 patent in that an existing facility must be replaced to utilize the device of the '523 patent. Moreover, litter will extend under the screen area where it will be unusable by the animal and thus wasted.

The devices taught by U.S. Pat. No. 5,092,277 also includes a screen over which the animal must walk when exiting the litter pan. However, the screens are offset above the litter area which results in a structure which is more complicated and much larger than an average litter box structure.

U.S. Pat. No. 5,195,464 discloses a sanitary facility for animals which includes an integral tray unit having a litter area and a front access compartment. The front access compartment includes a grid for dislodging particles clinging to the animal's feet or paws upon exit from the rear litter area. Disposal of contents within the front and rear compartments must be done concurrently. Additionally, the screen provided in the front compartment can be easily avoided by the animal. Furthermore, the screen is not adapted for use with an existing litter box.

U.S. Pat. No. 5,220,886 discloses a litter box accessory including a generally concave grate seated over the base of a tray. Similarly, U.S. Pat. No. 5,388,550 discloses an apron adapted to be fitted to an existing sanitary facility for animals having a pan containing litter and a cover. In both devices, the configuration of the auxiliary structure does not facilitate quick and easy emptying thereof.

Therefore, the need exists for an arrangement which will provide a screen in the path of animal exiting from a litter box to remove the debris from the animal's paws which can be easily emptied.

SUMMARY OF THE INVENTION

It is a principal object of the present invention to provide a debris containment system which overcomes the disadvantages of known structures, including but not limited to those discussed above.

It is a related object of the present invention to provide a debris containment system which is specifically adapted for collecting debris which may be tracked from a litter box for easy disposal or reuse.

It is another object of the present invention to provide a debris containment system having a tray for collecting debris which may be tracked from a litter box which can be used with an existing litter box.

It is another object of the present invention to provide a debris containment system which includes a tray for collecting litter tracked from a litter box which is configured to facilitate easy disposal or reuse.

It is a more specific object of the present invention to provide a tray for collecting debris tracked from a litter box having an integrally formed funnel portion.

In one form, the present invention provides a debris containment system for use with a litter box adapted to collect debris carried by an animal's paws as the animal exits the litter box. The debris containment system includes a collection pan positioned in close proximity to the litter box. The collection pan includes a generally flat lower surface. The collection pan further includes a funnel shaped portion interconnected to the generally flat lower surface.

In a more preferred form, the present invention provides a debris containment system for use with a litter box adapted to collect debris carried by an animal's paws as the animal exits the litter box. The debris containment system includes a generally rectangular tray for collecting the debris. The generally rectangular tray includes a bottom and four upwardly extending sides. A funnel portion is formed in at least one of the four upwardly extending sides and facilitates pouring of the debris from the generally rectangular tray. The debris containment system further includes a grid member disposed within the generally rectangular tray for dislodging the debris from the animal's paws as the animal exits the litter box.

In another form, the present invention is directed to a method of containing debris tracked by an animal as it exits a litter box. The method comprises the step of providing a collection pan for collecting debris integrally formed to include a funnel portion. The method further includes the steps of positioning the collection pan adjacent to the litter and collecting the debris as the animal exits the litter box. In another step of the method, the debris emptied from the collection pan by tilting the collection pan and pouring the debris through the funnel portion. In a preferred form, the method of the present invention furthers includes the steps of providing a grid member for spreading the paws of the animal as the animal exits the litter box and placing the grid member in the collection pan.

BRIEF DESCRIPTION OF THE DRAWINGS

Additional objects and advantages of the present invention will become apparent from a reading of the following detailed description of the preferred embodiment which

DETAILED DESCRIPTION OF THE PREFERRED EMBODIMENT

Figure 1:
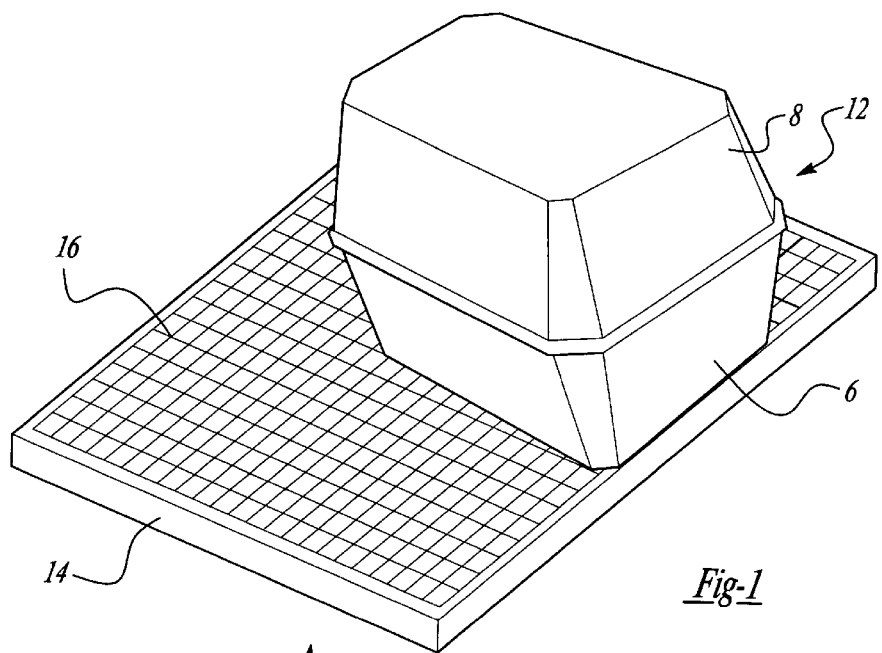
FIG. 1 is a debris containment system constructed in accordance with a preferred embodiment of my invention and shown operatively arranged with a conventional litter box.
Figure 2:
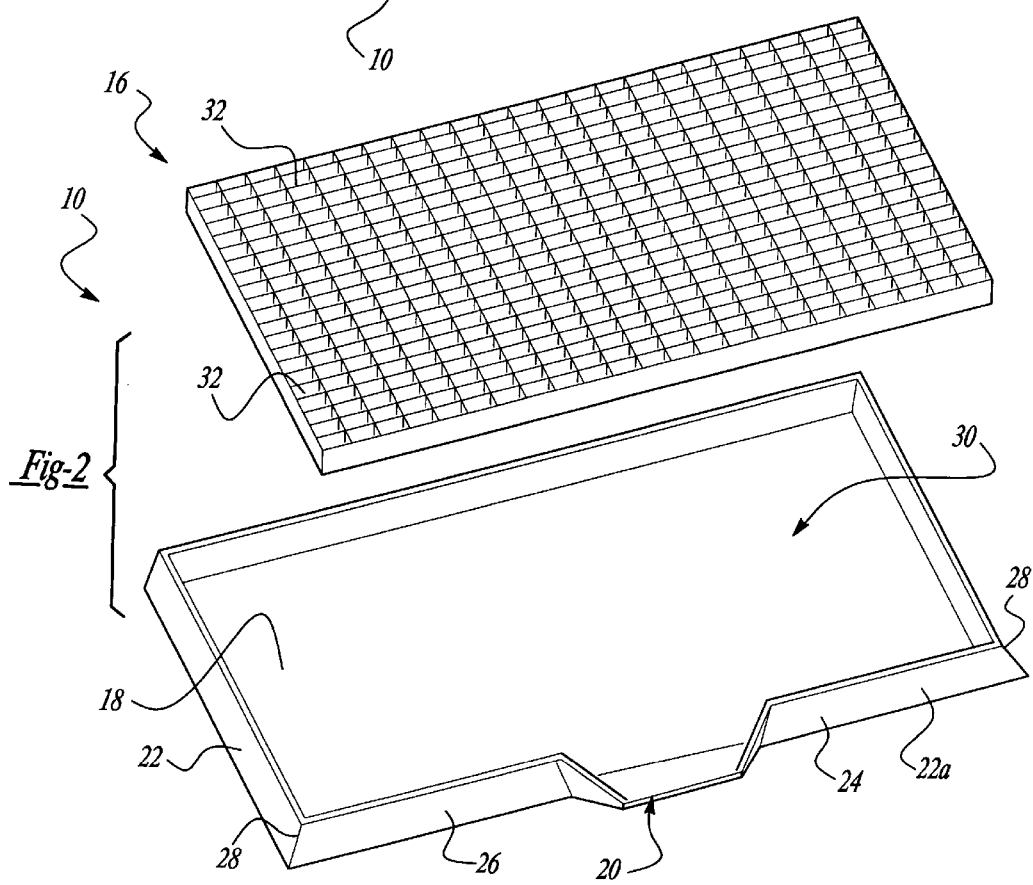
FIG. 2 is an exploded view of the debris containment system of FIG. 1.

Referring generally to FIGS. 1 and 2 of the drawings in which common reference numerals are used throughout, a preferred embodiment of a debris containment system constructed in accordance with the teachings of the preferred embodiment of the present invention is identified with reference numeral 10. As will become apparent below, the preferred embodiment of the debris containment system 10 illustrated throughout the drawings is specifically intended to be utilized with a conventional litter box 12. Prior to addressing the litter containment system 10 of the present invention, a brief understanding of an exemplary litter box 12 suitable for use with the containment system 10 is warranted.

With reference to the environmental view of FIG. 1 of the drawings, the exemplary litter box 12 is shown cooperatively arranged with the litter containment system 10. The litter box 12 is of two-part construction including a base 6 and a top 8. The base 6 contains absorbent material such as sand or litter (not shown). The top 8 substantially encloses the litter and defines an opening (not shown) through which an animal, such as a house cat, may enter the litter box 12 for sanitary purposes.

With continued reference to FIG. 1 and additional reference to the exploded view of FIG. 2, the debris containment system 10 of the present invention is shown to generally include a collection pan 14 and means for extracting debris from the paws of the animal as it exits the litter box 12. In the preferred embodiment, the collection pan 14 is unitarily constructed of a durable, flexible rubber or other suitable material which provides an easily clean surface. The collection pan 14 includes a generally flat, lower surface 18, or bottom, and a funnel portion 20 which is interconnected to the lower portion 18. The collection pan 14 further includes a plurality of upwardly extending sides 22. In the embodiment illustrated, the collection pan 14 is generally rectangular and includes four upwardly extending sides 22. However, it will be understood by those skilled in the art that the collection pan 14 can include any specific number of sides. In this regard, the collection pan 14 may even be round, thereby only including a single arcuate side.

Further in the preferred embodiment, one of the sides 22a is formed to integrally include the funnel portion 20. In this regard, the side 22a includes a pair of wall segments 24 and 26 which are interrupted by the funnel portion 20. Alternatively, it will be appreciated by those skilled in the art that the funnel portion 20 can be formed at one of the corners 28 of the collection pan 14. The four sides 22 and the bottom 18 of the collection pan 14 define a receiving area 30 for collecting debris as it is tracked from the litter box 12. This will become more apparent below.

In the embodiment illustrated, the means for extracting debris from the paws of the animal is provided in the form of a grid member 16 which is placed within the collection pan 14. The grid member 16 is preferably provided with a plurality of openings 32. In one application, the openings 32 are square in configuration and are approximately ½ inch by ½ inch. The plurality of openings 32 allow litter particles (i.e. debris) carried by the animal and dislodged by the grid member 16 to drop through the openings 32 into the receiving area 30 of the collection pan 14 for collection and subsequent removal.

The collection pan 14 and grid member 16 are appropriately dimensioned such that an animal utilizing the litter box 12 is forced to step on the grid member 16 with each of its paws to thereby dislodge litter particles clinging to the animal's feet or paws when exiting the litter box 12. In one application, the pan 14 is approximately 24 inches by 30 inches and the grid member 16 is sized accordingly. It is important that the components of the debris containment system 10 are sufficiently large so that the animal is not able avoid the grid member 16 by simply leap over it. As shown in FIG. 1, it may be desired to set the litter box 12 immediately on top of the grid 16 of the debris containment system 10.

In use of the debris containment system 10 of the present invention, litter carried by a cat from a litter box 12 is extracted when the cat walks across the grid member 16. The litter falls through the openings in the grid member 16 is deposited in the receiving area 30 of the collection pan 14. When litter (i.e., the debris) collects in the pan 14, the grid member 16 is removed and the litter can be quickly and easily poured from the pan 14 through the funnel 20. In the preferred embodiment, the durable, flexible rubber or other material of which the pan 14 is construction is sufficiently flexible to permit the pan 14 to be effectively folded in half to facilitate emptying. In this regard, the pan 14 can be folded along a center line of the pan 14 which passes through the funnel 20. The litter can be then deposited in a waste receptacle or returned to the litter box 12. It will be appreciated that if the funnel 20 is formed in a corner 28 of the collection pan 14, the center line of the pan 14 about which the pan 14 is folded would diagonally bisect the pan 14.

The foregoing discussion discloses and describes merely an exemplary embodiment of an apparatus constructed in accordance with the present invention and a related method. One skilled in the art will readily recognize from such discussion and from the accompanying drawings that various changes, modifications and variations can be made thereto without departing from the spirit and scope of the present invention.

What is claimed is:

1. A debris containment system adapted to collect debris carried by an animal's paws as the animal exits the litter box, the debris containment system comprising:

a litter box; and a flexible collection pan positioned in close proximity to the litter box, the collection pan including a generally flat lower surface upstanding substantially linear sidewall and a funnel shaped portion interconnected to and extending upwardly from the generally flat lower surface, said lower surface adapted to be folded about a center line which intersects said funnel shaped portion.

2. The debris containment system of claim 1, wherein a portion of said collection pan is positioned subadjacent to the litter box.

3. The debris containment system of claim 1, further comprising means for extracting debris from the animal's paws.

4. The debris containment system of claim 3, wherein said means for extracting debris from the animal's paws comprises a grid member disposed in said collection pan.

5. The debris containment system of claim 1, wherein said collection pan is integrally formed of a flexible rubber.

6. The debris containment system of claim 1, further comprising a plurality of walls upwardly extending from said generally flat lower surface, said funnel shaped portion being formed in at least one of said plurality of walls.

7. A debris containment system adapted to collect debris carried by an animal's paws as the animal exits the litter box, the debris containment system comprising:

a litter box;

a generally rectangular flexible tray for collecting the debris, said generally rectangular tray including a bottom and four upwardly extending sides;

a funnel portion formed in at least one of said four upwardly extending sides to facilitate pouring of the debris from said generally rectangular tray; and a grid member disposed within said generally rectangular tray for dislodging the debris from the animal's paws as the animal exits the litter box;

said generally rectangular tray adapted to fold about a centerline passing through said funnel portion to facilitate disposal of collected debris.

8. The debris containment system of claim 7, wherein a portion of said generally rectangular tray is positioned subadjacent to the liter box.

9. The debris containment system of claim 7, wherein said generally rectangular tray is integrally formed of a flexible rubber.

10. A method of containing debris tracked by an animal as it exits a litter box, the method comprising the steps of:

providing a collection pan for collecting debris integrally formed to include a funnel portion;

positioning the collection pan adjacent to the litter box;

collecting the debris as the animal exits the litter box;

folding the collection pan along a centerline passing through said funnel portion; and emptying the debris from said collection pan by tilting said collection pan and pouring the debris through said funnel portion.

11. The method of claim 6, further including the step of returning the debris to the litter box.

12. The method of claim 10, further including the steps of:

providing a grid member for spreading the paws of the animal as the animal exits the litter box; and placing the grid member in the collection pan.

* * * * *